United States Patent
Davis (10) Patent No.: US 10,621,349 B2
(45) Date of Patent: Apr. 14, 2020

(54) DETECTION OF MALWARE USING FEATURE HASHING

(71) Applicant: Cylance Inc., Irvine, CA (US)

(72) Inventor: Andrew Davis, Portland, OR (US)

(73) Assignee: Cylance Inc., Irvine, CA (US)

( * ) Notice: Subject to any disclaimer, the term of this patent is extended or adjusted under 35 U.S.C. 154(b) by 184 days.

(21) Appl. No.: 15/873,746

(22) Filed: Jan. 17, 2018

(65) Prior Publication Data

US 2018/0211041 A1     Jul. 26, 2018

Related U.S. Application Data

(60) Provisional application No. 62/449,764, filed on Jan. 24, 2017.

(51) Int. Cl.
| | |
|---|---|
| H04L 29/06 | (2006.01) |
| G06F 21/56 | (2013.01) |
| G06N 5/02 | (2006.01) |
| G06F 21/55 | (2013.01) |
| G06N 20/00 | (2019.01) |

(52) U.S. Cl.
CPC .......... *G06F 21/566* (2013.01); *G06F 21/552* (2013.01); *G06F 21/564* (2013.01); *G06N 5/022* (2013.01); *G06N 20/00* (2019.01)

(58) Field of Classification Search
CPC .... G06F 21/566; G06F 21/552; G06F 21/564; G06N 5/022
See application file for complete search history.

(56) References Cited

U.S. PATENT DOCUMENTS

| | | | |
|---|---|---|---|
| 8,321,941 B2* | 11/2012 | Tuvell | G06F 21/56 726/24 |
| 9,262,296 B1* | 2/2016 | Soeder | G06F 11/3604 |
| 9,690,938 B1* | 6/2017 | Saxe | G06F 21/563 |
| 2013/0290223 A1* | 10/2013 | Chapelle | G06N 20/00 706/12 |
| 2013/0291111 A1* | 10/2013 | Zhou | G06F 21/566 726/23 |
| 2016/0180200 A1* | 6/2016 | Vijayanarasimhan | G06K 9/6267 382/157 |
| 2018/0089424 A1* | 3/2018 | Yang | G06F 21/552 |
| 2018/0189481 A1* | 7/2018 | Liu | G06F 21/53 |
| 2018/0203998 A1* | 7/2018 | Maisel | G06F 21/565 |
| 2019/0138721 A1* | 5/2019 | Wojnowicz | G06F 21/56 |

* cited by examiner

*Primary Examiner* — Sarah Su (74) *Attorney, Agent, or Firm* — Jones Day (57) ABSTRACT

Data is analyzed using feature hashing to detect malware. A plurality of features in a feature set is hashed. The feature set is generated from a sample. The sample includes at least a portion of a file. Based on the hashing, one or more hashed features are indexed to generate an index vector. Each hashed feature corresponds to an index in the index vector. Using the index vector, a training dataset is generated. Using the training dataset, a machine learning model for identifying at least one file having a malicious code is trained.

20 Claims, 5 Drawing Sheets

DETECTION OF MALWARE USING FEATURE HASHING

RELATED APPLICATION

This application claims priority to U.S. Pat. App. Ser. No. 62/449,764 filed on Jan. 24, 2017, the contents of which are hereby fully incorporated by reference.

TECHNICAL FIELD

This disclosure relates generally to data processing and, in particular, to feature hashing for the purposes of malware detection and analysis.

BACKGROUND

In today's world, many companies rely on computing systems and software applications to conduct their business. Computing systems and software applications deal with various aspects of companies' businesses, which can include finances, product development, human resources, customer service, management, and many other aspects. Businesses further rely on communications for a variety of purposes, such as, exchange of information, data, software, and other purposes. Computing systems/software are frequently subject to cyberattacks by viruses, malicious software or malware, and/or other ways that can be highly disruptive to operations of the computing systems/software. Malware can disrupt computer operations, gather sensitive information, gain access to private computer systems, or the like. Malware is typically defined by its malicious intent and does not include any software that may cause unintentional harm due to some deficiency.

Malware typically operates in a stealthy mode and can steal information and/or spy on computer users during a particular period of time, which can be an extended period of time. It operates without knowledge of the users and can cause significant harm, including sabotage of computing system, extortion of payment, etc. Malware can include, but is not limited to computer viruses, worms, Trojan horses, ransomware, spyware, adware, scareware, and other malicious programs. It can be an executable code, scripts, active content, and/or other software. In order to gain access to computing systems, malware is often disguised as, or embedded in, non-malicious files. Periodically, malware can be found embedded in programs officially supplied by legitimate companies, e.g., downloadable from websites, which can be useful or attractive, but having hidden tracking functionalities that gather marketing statistics.

A variety of methods have been implemented in the computing world to combat malware and its variants. These include anti-virus and/or anti-malware software, firewalls, etc. These methods can actively and/or passively protect against malicious activity and/or can be used to recover from a malware attack. Training sets are developed for the purposes of training machine learning models that can be used to detect presence of malicious code in data. To generate such training sets, a significant analysis of data and pre-processing activities may need to be performed, which can cause a delay. Further, existing training sets may be large, which may make it difficult training machine learning models. Thus, there is a need for a way to perform expedient analysis of data, extraction of features contained in the data, generation of a reduced size training set, and determination whether malware may exist in the data using such training set.

SUMMARY

In some implementations, the current subject matter relates to a computer implemented method for performing analysis of data to detect malware using feature hashing. The method can include hashing a plurality of features in a feature set. The feature set is generated from a sample, which includes at least a portion of a file. The method further includes indexing one or more hashed features to generate an index vector. Each hashed feature corresponds to an index in the index vector. The method also includes generating a training dataset using the index vector and training a machine learning model for identifying at least one file having a malicious code using the training dataset.

In some implementations, the current subject matter can include one or more of the following optional elements in any feasible combination. The file can have a portable executable format, a document format, a file format, an executable format, a script format, an image format, a video format, an audio format, and any combination thereof.

In some implementations, the index can include a value corresponding to a hashed feature and a sign attribute. The value can be determined based on a name of each hashed feature. The sign attribute can include at least one of the following: a positive value and a negative value. In some implementations, the indexing can include generating a plurality of index vectors for a plurality of feature sets.

In some implementations, the indexing can also include determining a plurality of most frequently occurring indexes in the plurality of index vectors. The machine learning model can be trained using the training dataset generated based on the plurality of most frequently occurring indexes.

In some implementations, the method can also include determining that a first feature, having a first index, collides with a second feature, having a second index. The determination can be based on the hashing. The method can then assign a first sign attribute to the first index and a second sign attribute to the second index. The first sign attribute can be different from the second sign attribute. Using assigned sign attributes, the index vector having the first index and the second index can be generated.

In some implementations, a combination of each index and a sign attribute for each feature corresponds to a predetermined position in the index vector. The index vector can have a predetermined size.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

In some implementations, the current subject matter relates to performing analysis of data to detect malware using feature hashing. The current subject matter can extract features from samples of data, such as, files, portions of a file, and/or multiple files, where features can be independent variables representative of a file or a part of a file, in some examples including a file having a portable executable format. Once the features are extracted, a list of features can be generated and a hash can be applied to each feature in the list of features for the purposes of generating an index vector, where each index in the index vector can correspond to a hash value representative of each feature and a sign attribute. The index vectors can be analyzed to determine most frequently occurring indexes. The most frequently occurring indexes can be assembled together into a feature vector for the purposes of representing all features in all data samples that may be received. Using the assembled feature vector, a training dataset can be determined for the purposes of training a machine learning model to identify presence of malware or other malicious code in the data.

Some advantages of the current subject matter can include a substantial reduction of pre-processing time that can be associated with determination of whether malicious code exists in the received data. The current subject matter can perform extraction of features from samples of data to significantly reduce the number of features (e.g., "feature space") that can be used for generating a training set to train a machine learning model. For example, based on the extracted features, the current subject matter can determine which features may be most frequently occurring in the samples of data.

In some implementations, feature names can be used for the purpose of extracting features from samples of data so as to reduce the size of the feature space, based on which a feature vector can be generated for training of a machine learning model. Using the feature names, a mapping of the feature names can be generated for the purpose of generating the feature vector. For example, given a string of characters in a sample of data (e.g., a portable executable ("PE") parser string="This program cannot run in MS DOS mode"), a hashing function (e.g., the MD5 hashing function) can be applied to the string to generate a hashed representation of the sample of data. As a result of hashing, the number of such representations can be smaller than the number of received PE format files, thereby substantially reducing the feature space that is used to generate the feature vector. As a non-limiting example, a feature space of 5000 features may be reduced, by way of hashing, consistent with the approaches described herein, to a set of 1000 features.

Hashing approaches can be used to extract features from data. For example, a vector containing a plurality of features can be generated. Then, a hash function can be applied to the features and hash values can be used as indices. Some conventional systems extract features and use a layered approach of deep neural networks to provide an implicit categorization of binary types for directly training on all binaries (without separating them based on internal features). However, existing systems are generally capable of neither substantial reduction of pre-processing time nor reduction of feature space.

In some implementations, the current subject matter can extract features from portable executable ("PE") format files. PE format files can be structured files that are used by the WINDOWS operating system and can include executables, object code, DLLs, FON Font files, and/or any other file types. Structured files can contain any additional data including resources (e.g., images, text, etc.) and descriptive and/or prescriptive metadata and, as such, are often used for malicious purposes such as insertion of malware. Further, the structured file can take varying forms including, but not limited to, PE format files, disk operating system ("DOS") executable files, new executable ("NE") files, linear executable ("LE") files, executable and linkable format ("ELF") files, JAVA Archive ("JAR") files, SHOCKWAVE/FLASH ("SWF") files, and/or any other files.

Figure 1:
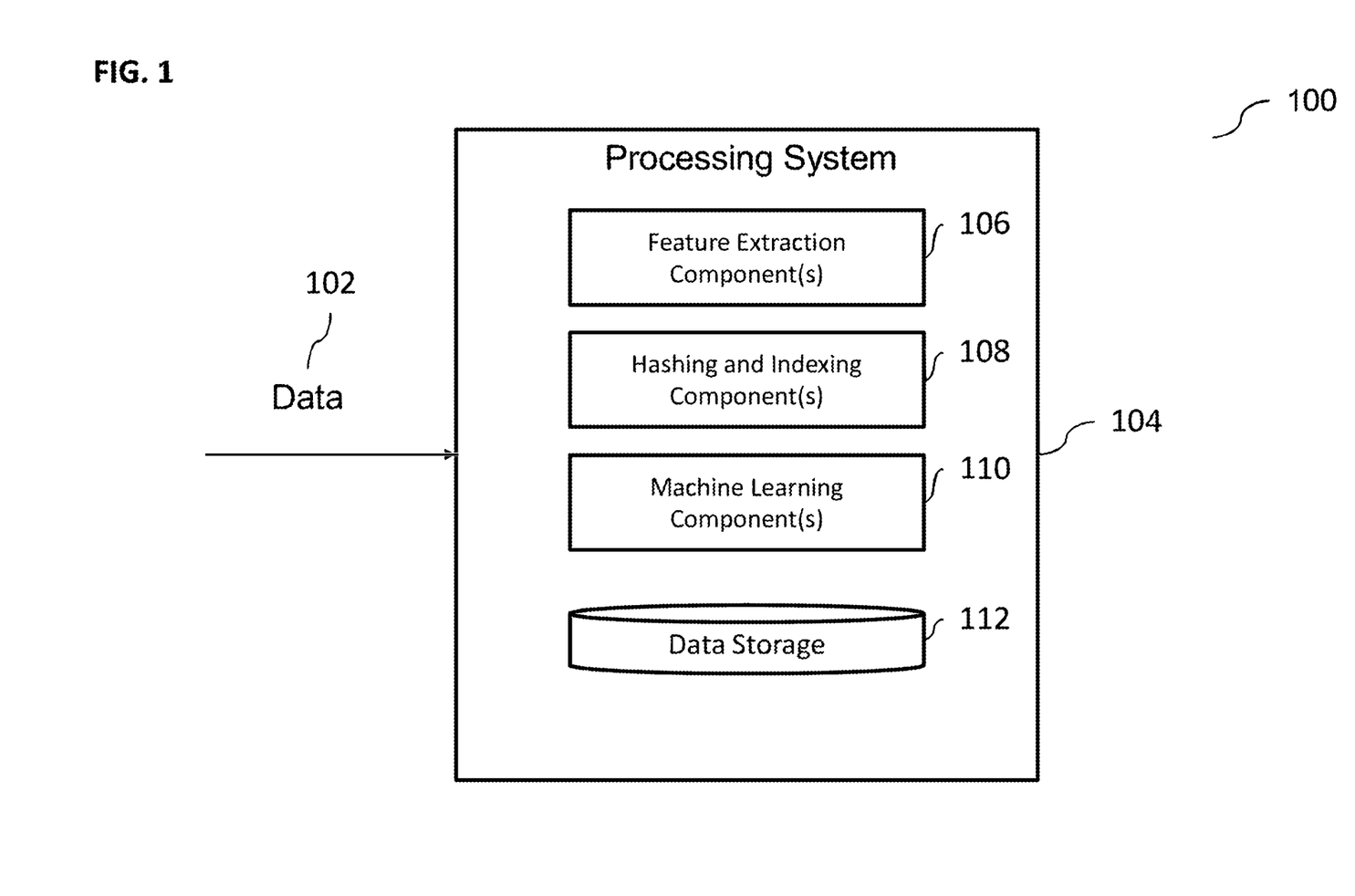
FIG. 1 illustrates an exemplary system for performing feature hashing for the purposes of detecting presence of a malicious code, according to some implementations of the current subject matter.

FIG. 1 illustrates an exemplary system 100 for performing feature hashing for the purposes of detecting presence of malicious code, according to some implementations of the current subject matter. The system 100 can include a processing system 104, which can include feature extraction component(s) 106, hashing and indexing component(s) 108, machine learning component(s) 110, and a data storage component 112.

The data 102 can be any data, programs, functions, etc. (e.g., PE format files, etc.) that can be received by the processing system 104. The data 102 can be received by the processing system 104 via a communications network, e.g., the Internet, an intranet, an extranet, a local area network ("LAN"), a wide area network ("WAN"), a metropolitan area network ("MAN"), a virtual local area network ("VLAN"), and/or any other network. The data 102 can be received via a wireless, a wired, and/or any other type of connection. The processing system 104 can be implemented using software, hardware and/or any combination of both. The system 104 can also be implemented in a personal computer, a laptop, a server, a mobile telephone, a smartphone, a tablet, and/or any other type of device and/or any combination of devices. The component(s) 106-112 can be separate components and/or can be integrated into one or more single computing components.

The feature extraction component(s) 106 can perform analysis of the data 102 and extract features from the data 102. This can be accomplished by parsing the data 102 to extract features, such as, using names of the features (e.g., strings, etc.). In some implementations, feature extraction can be accomplished by parsing the data 102 to extract features, for example as described in co-owned U.S. Pat. No. 9,262,296, filed Jan. 31, 2014, issued Feb. 16, 2016, and entitled "Static Feature Extraction From Structured Files," the disclosure of which is incorporated herein by reference in its entirety. A listing of the features can be created.

The hashing and indexing component(s) 108 can be used to apply a hashing function to each feature in the listing of the features. As a result of hashing, a hash of each feature can result in a hash value (or a string), where the hash value can be assigned a unique identifier or an index. The indexes corresponding to hashed features can be assembled into an index vector that can be representative of a particular feature set for a data sample. Additionally, in some implementations, to avoid collision among indexes (e.g., two indexes representative of features having the same value), each index can be assigned a particular sign attribute. The sign attribute can include a positive value ("+") or a negative value ("−"). For example, a 32 bit index can include 1 bit corresponding to the sign attribute and 31 bits to the actual value of the index.

Figure 3:
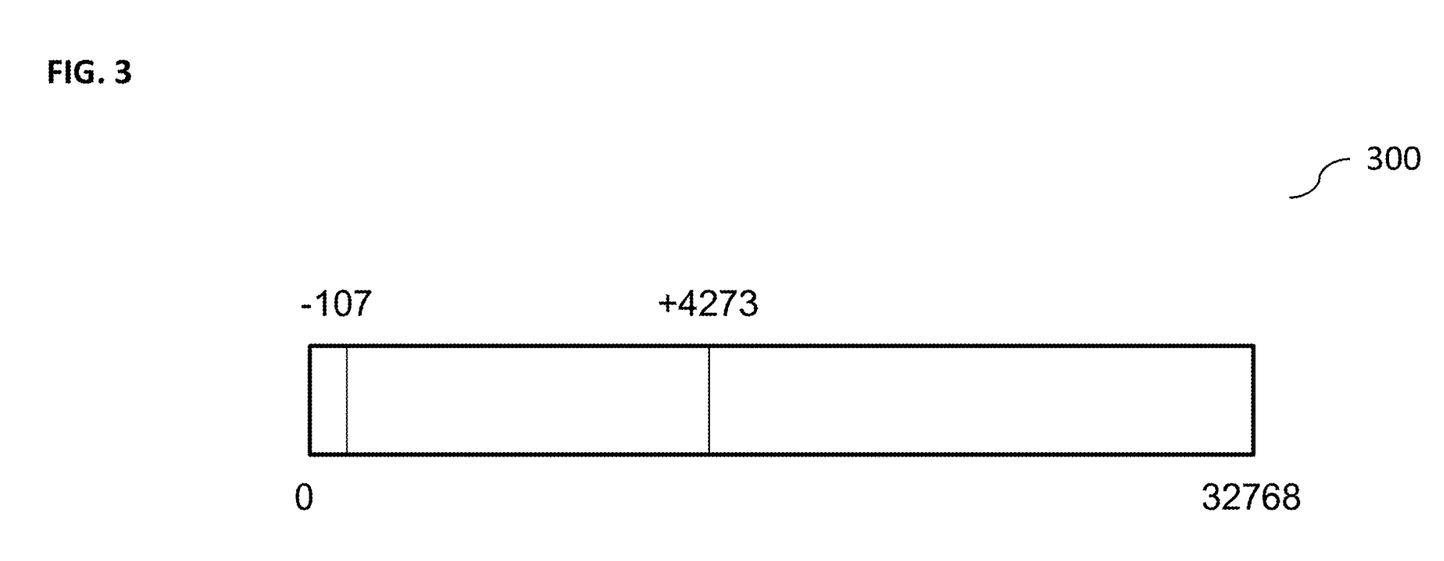
FIG. 3 illustrates an exemplary feature vector, according to some implementations of the current subject matter.

Each index can be assigned a particular location in the index vector. The index vector can have a predetermined size, where the size can be fixed. An exemplary index vector 300 is shown in FIG. 3. The index vector 300 can have a size of 32768 bits. The index vector 300 can have any other desired size.

The indexes for all feature sets can be compared to one another to determine most frequently occurring indexes. The most frequently occurring indexes can be submitted to the machine learning component(s) 110 for the purposes of generating a training dataset. Alternatively, all determined indexes can be submitted to the machine learning component(s) 110 for the purposes of generating a training dataset. The training dataset that can be used to perform training of a machine learning model for the purposes of identifying presence of a malicious code in the data 102.

The data storage component 112 can be used for storage of data processed by the system 104 and can include any type of memory, e.g., a temporary memory, a permanent memory, and/or any other type of memory and/or any combination thereof.

Figure 2:
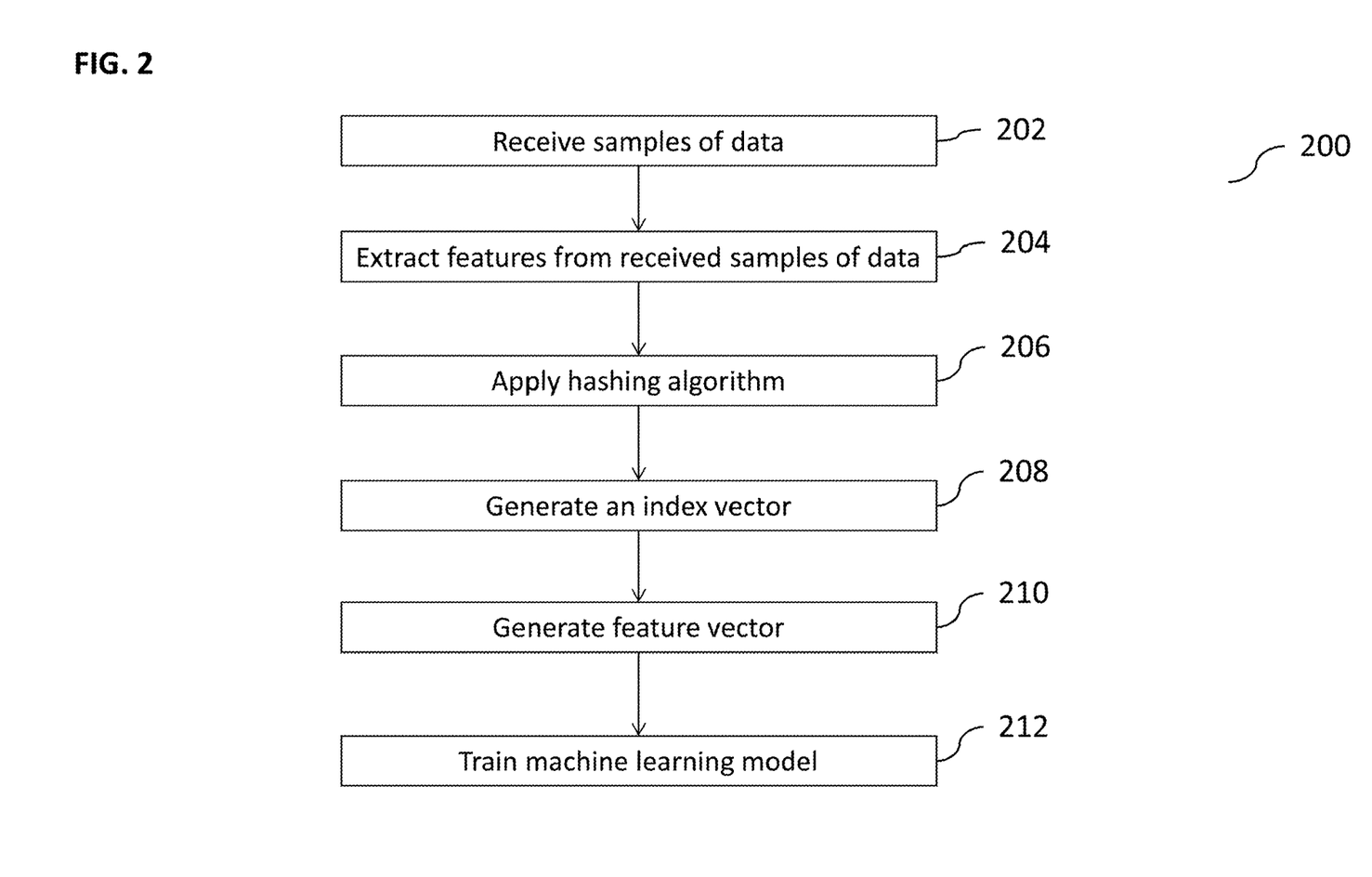
FIG. 2 illustrates an exemplary process for performing feature hashing for the purposes of detecting presence of a malicious code, according to some implementations of the current subject matter.

FIG. 2 illustrates an exemplary process 200 for performing feature hashing for the purposes of detecting presence of malicious code, according to some implementations of the current subject matter. The process 200 can be performed by system 100 (as shown in FIG. 1).

At 202, samples of data can be received at a processing node (e.g., processing system 104 shown in FIG. 1). The samples of data can include PE format files and/or any other files. At 204, features can be extracted from the received data samples to generate a listing of features. A hashing algorithm can be applied to a plurality of features and/or each feature in the listing of extracted features, at 206. Once features are hashed, an index vector can be generated, at 208. The index vector can include an index value, which can be a name (e.g., a string) or a unique identifier corresponding to the hashed value of each feature. Additionally, the index value can include a sign attribute. The predetermined value can be indicative of a particular position or a bucket in which the hashed value of the extracted feature can be positioned in the index vector. The sign attribute can have a '+1' or a '−1' value. It can be used to avoid collision of features in the index vector. For example, if two extracted features after hashing have the same identifier, an appropriate sign attribute can be assigned to the identifier of one or both colliding features to avoid collisions. In some exemplary implementations, the hashes of the features that are obtained can be 32-bit hashes, which can include 31 bits corresponding to the index value or identifier for the hash value of the feature and 1 bit corresponding to the sign attribute. Other sizes of indexes can be used. As stated above, an exemplary index vector 300 is shown in FIG. 3. The exemplary index vector 300 can be generated using the following non-limiting exemplary PE strings:

PE ParserString="Hello World"→bucket 4273, sign+
PE ParserWaveletSection.text=6.32→bucket 107, sign−

The names of the above PE strings can be hashed (as shown by "→") to determine their bucket or position within the index vector 300, which can have a size of 32768 bits (as an example). The first PE sample having features "Hello World" can be hashed to produce an identifier value of 4273 and placed into an index (or bucket, position, location, etc.) 4273 (as shown in FIG. 3). The second PE sample can be hashed to produce an identifier value of 107 and placed into an index (or bucket, position, location, etc.) 107 (as shown in FIG. 3). The index corresponding to the first PE sample can be assigned '+1' sign attribute and the index corresponding to the second PE sample can be assigned '−1' sign attribute. This can be done to avoid collision among index values in the index vector, such as, for example, when two indexes have values falling into the same bucket in the index vector.

At 210, one or more index vectors, generated as a result of hashing of all features relating to a plurality of data samples, can be compared to one another to determine most frequently occurring indexes. The most frequently occurring indexes can be combined to form a feature vector. The feature vector can be used to compute a training dataset for the purposes of training a machine learning model, at 212. The feature vector can be representative of one or more features in the data samples that have been already received and/or can be used to ascertain features present in any future data samples to identify presence of malicious code in the data.

Some of the advantages of the current subject matter can include reduction of processing times to generate feature vectors for ascertaining presence of malicious code. Further, the feature vectors that can be generated using the current subject matter system can be smaller in size and less dependent on specific data samples and/or a number of data samples that may need to be processed in advance. Additionally, the current subject matter's feature vectors can include rare features that are typically not detected/included in conventional approaches.

Figure 4:
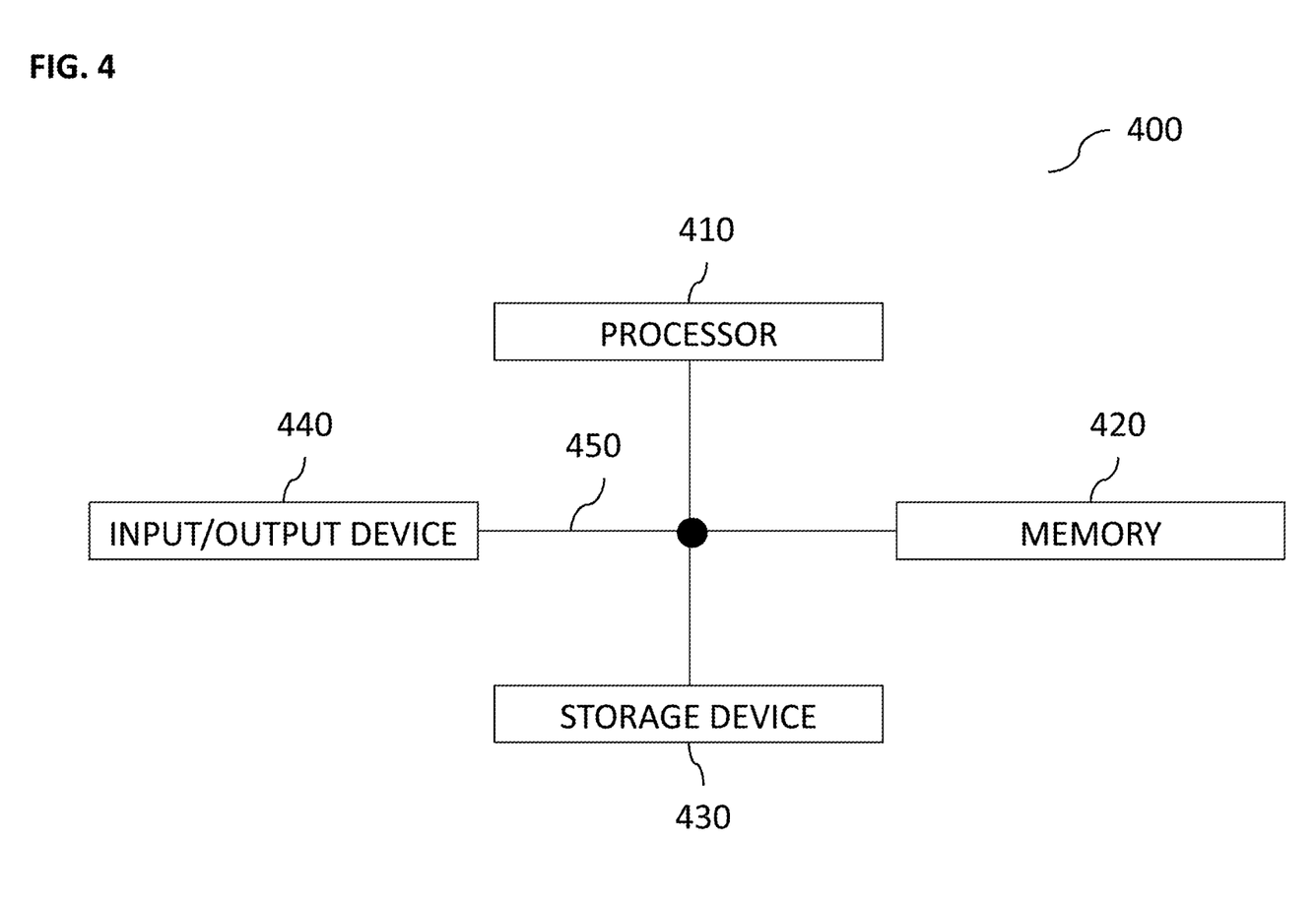
FIG. 4 illustrates an exemplary system, according to some implementations of the current subject matter.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In various implementations, the memory 420 can include one or more a computer-readable medium, a volatile memory unit, and/or a non-volatile memory unit. The storage device 430 can be capable of providing mass storage for the system 400. In some implementations, the storage device 430 can include a computer-readable medium, such as, for example, a floppy disk device, a hard disk device, an optical disk device, a tape device, a non-volatile solid state memory, or any other type of storage device. The input/output device 440 can be configured to provide input/output operations for the system 400. In some implementations, the input/output device 440 can include one of a keyboard, a mouse, a pointing device, a touch screen, a display unit for displaying graphical user interfaces, and/or the like.

Figure 5:
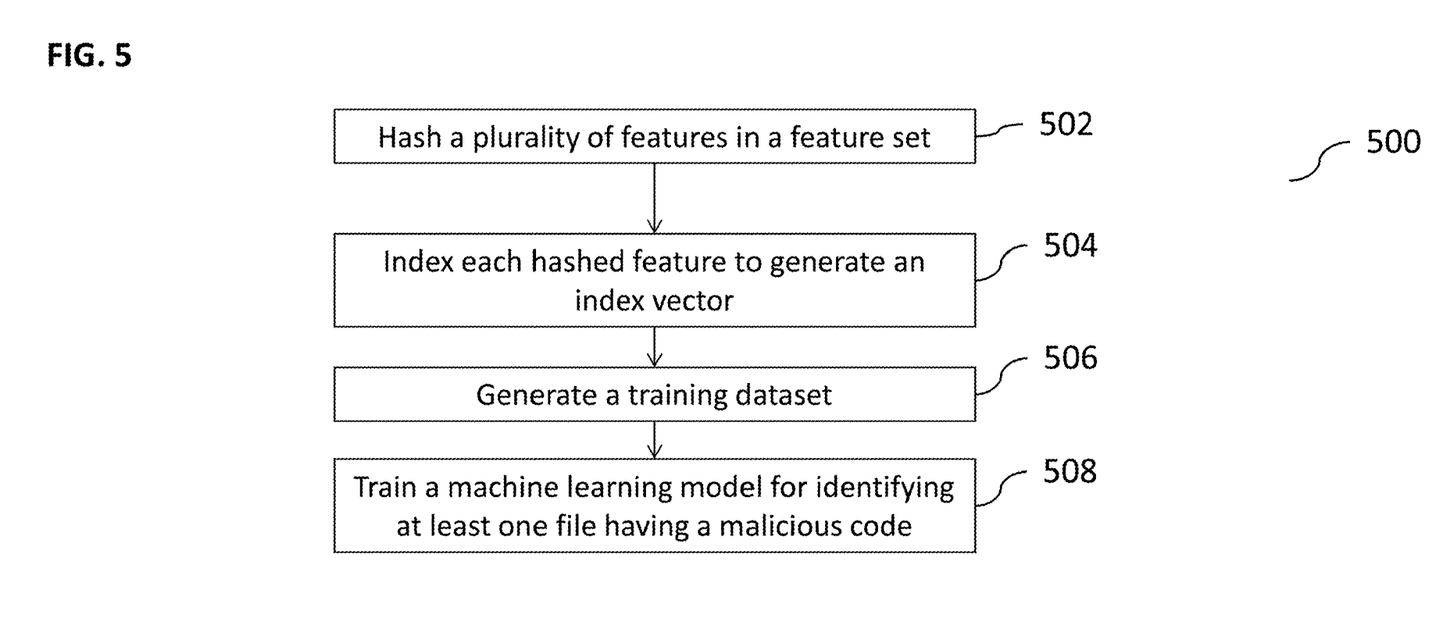
FIG. 5 illustrates an exemplary method, according to some implementations of the current subject matter.

FIG. 5 illustrates an exemplary method 500, according to some implementations of the current subject matter. At 502, a plurality of features in a feature set can be hashed, where the feature set can be generated from a sample. The sample can include at least a portion of a file (e.g., a PE sample). At 504, based on the hashing, one or more hashed features can be indexed to generate an index vector. Each hashed feature can correspond to an index in the index vector. The index can include an index value, e.g., a unique identifier representative of a hash of a feature in the feature set. At 506, using the index vector, a training dataset can be determined. At 508, using the training dataset, a machine learning model can be trained to identify at least one file having a malicious code.

In some implementations, the current subject matter can include one or more of the following optional elements. The format of the file can include at least one of a portable executable format, a document format, a file format, an executable format, a script format, an image format, a video format, an audio format, and any combination thereof.

In some implementations, the index can include a value corresponding to a hashed feature and a sign attribute. The value can be determined based on a name of each hashed feature. The sign attribute can include at least one of the following: a positive value and a negative value. In some implementations, the indexing can include generating a plurality of index vectors for a plurality of feature sets.

In some implementations, the indexing can also include determining a plurality of most frequently occurring indexes in the plurality of index vectors. The machine learning model can be trained using the training dataset generated based on the plurality of most frequently occurring indexes.

In some implementations, the method can also include determining, based on the hashing, a first feature, having a first index, colliding with a second feature, having a second index, assigning a first sign attribute to the first index and a second sign attribute to the second index, the first sign attribute being different from the second sign attribute, and generating, using assigned sign attributes, the index vector having the first index and the second index.

In some implementations, a combination of each index and a sign attribute for each feature corresponds to a predetermined position in the index vector. The index vector can have a predetermined size.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method comprising:
hashing a plurality of features in a feature set, wherein the feature set is generated from a sample and the sample includes at least a portion of a file;
indexing, based on the hashing, one or more hashed features to generate a plurality of index vectors each corresponding to a different feature set, wherein each hashed feature corresponds to an index in the index vector;
generating, using the index vector, a training dataset; and
training, using the training dataset, a machine learning model for identifying at least one file having a malicious code;
wherein:
the indexing further comprises determining a plurality of most frequently occurring indexes in the plurality of index vectors; and
the machine learning model is trained using the training dataset generated based on the plurality of most frequently occurring indexes.

2. The method according to claim 1, wherein a format of the file is selected from a group consisting of: a portable executable format, a document format, a file format, an executable format, a script format, an image format, a video format, and an audio format.

3. The method according to claim 1, wherein the index includes a value corresponding to a hashed feature and a sign attribute.

4. The method according to claim 3, wherein the value is determined based on a name of each hashed feature.

5. The method according to claim 4, wherein the sign attribute includes at least one of the following: a positive value and a negative value.

6. The method according to claim 5, further comprising
determining, based on the hashing, a first feature, having a first index, colliding with a second feature, having a second index;
assigning a first sign attribute to the first index and a second sign attribute to the second index, the first sign attribute is different from the second sign attribute; and
generating, using assigned sign attributes, the index vector having the first index and the second index.

7. The method according to claim 5, wherein a combination of each index and a sign attribute for each feature in the plurality of features corresponds to a predetermined position in the index vector.

8. The method according to claim 1, wherein the index vector has a predetermined size.

9. The method according to claim 1, wherein at least one of the hashing, the indexing, the generating, and the training is performed by at least one processor of at least one computing system, wherein the computing system comprises: at least one software component, at least one hardware component, and any combination thereof.

10. A system comprising:
at least one programmable data processor;
memory storing instructions which, when executed by the at least one programmable data processor, result in operations comprising:
hashing a plurality of features in a feature set, wherein the feature set is generated from a sample and the sample includes at least a portion of a file;
indexing, based on the hashing, one or more hashed features to generate a plurality of index vectors each corresponding to a different feature set, wherein each hashed feature corresponds to an index in the index vector;
generating, using the index vector, a training dataset; and
training, using the training dataset, a machine learning model for identifying at least one file having a malicious code;
wherein:
the indexing further comprises determining a plurality of most frequently occurring indexes in the plurality of index vectors; and
the machine learning model is trained using the training dataset generated based on the plurality of most frequently occurring indexes.

11. The system according to claim 10, wherein a format of the file is selected from a group consisting of: a portable executable format, a document format, a file format, an executable format, a script format, an image format, a video format, and an audio format.

12. The system according to claim 10, wherein the index includes a value corresponding to a hashed feature and a sign attribute.

13. The system according to claim 12, wherein the value is determined based on a name of each hashed feature.

14. The system according to claim 13, wherein the sign attribute includes at least one of the following: a positive value and a negative value.

15. The system according to claim 14, wherein the operations further comprise:
  determining, based on the hashing, a first feature, having a first index, colliding with a second feature, having a second index;
  assigning a first sign attribute to the first index and a second sign attribute to the second index, the first sign attribute is different from the second sign attribute; and
  generating, using assigned sign attributes, the index vector having the first index and the second index;
  wherein a combination of each index and a sign attribute for each feature in the plurality of features corresponds to a predetermined position in the index vector.

16. A non-transitory computer program product storing instructions which, when executed by comprising:
  at least one programmable data processor;
  memory storing instructions which, when executed by the at least one programmable data processor, result in operations comprising:
    hashing a plurality of features in a feature set, wherein the feature set is generated from a sample and the sample includes at least a portion of a file;
    indexing, based on the hashing, one or more hashed features to generate a plurality of index vectors each corresponding to a different feature set, wherein each hashed feature corresponds to an index in the index vector;
    generating, using the index vector, a training dataset; and
    training, using the training dataset, a machine learning model for identifying at least one file having a malicious code;
  wherein:
    the indexing further comprises determining a plurality of most frequently occurring indexes in the plurality of index vectors; and
    the machine learning model is trained using the training dataset generated based on the plurality of most frequently occurring indexes.

17. The non-transitory computer program product according to claim 16, wherein a format of the file comprises at least one of a portable executable format, a document format, a file format, an executable format, a script format, an image format, a video format, and an audio format.

18. The non-transitory computer program product according to claim 16, wherein the index includes a value corresponding to a hashed feature and a sign attribute.

19. The non-transitory computer program product according to claim 18, wherein the value is determined based on a name of each hashed feature.

20. The non-transitory computer program product according to claim 19, wherein the sign attribute includes at least one of the following: a positive value and a negative value.

* * * * *